USOO9561735B2

(12) United States Patent
Nozaki

(10) Patent No.: US 9,561,735 B2
(45) Date of Patent: Feb. 7, 2017

(54) ELECTRIC VEHICLE

(71) Applicant: KAWASAKI JUKOGYO KABUSHIKI KAISHA, Kobe-shi, Hyogo (JP)

(72) Inventor: Takuma Nozaki, Aioi (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 14/438,206

(22) PCT Filed: Oct. 30, 2012

(86) PCT No.: PCT/JP2012/006948
§ 371 (c)(1),
(2) Date: Apr. 23, 2015

(87) PCT Pub. No.: WO2014/068609
PCT Pub. Date: May 8, 2015

(65) Prior Publication Data
US 2015/0291056 A1    Oct. 15, 2015

(51) Int. Cl.
B60K 1/04    (2006.01)
B60L 11/18   (2006.01)
B60K 15/063  (2006.01)

(52) U.S. Cl.
CPC .............. B60L 11/1877 (2013.01); B60K 1/04 (2013.01); B60L 11/1822 (2013.01);
(Continued)

(58) Field of Classification Search
CPC .............. B60K 1/04; B60K 2001/0416; B60K 2001/0422; B60K 2001/0438; B60K 2001/0466; B60L 11/1877; B60L 11/1822; Y02T 90/124
See application file for complete search history.

(56) References Cited

U.S. PATENT DOCUMENTS 3,275,092 A * 9/1966 Matthews ................ B60K 1/04
                                                   180/68.5
3,610,359 A * 10/1971 Becker .................... B60K 1/04
                                                   180/68.5
(Continued)

FOREIGN PATENT DOCUMENTS

JP    S56128399 U    9/1981
JP    H01106370 U    7/1989
(Continued)

OTHER PUBLICATIONS

ISA Japanese Patent Office, International Search Report Issued in Application No. PCT/JP2012/006948, Dec. 11, 2012, WIPO, 4 pages.

Primary Examiner — Frank Vanaman
(74) Attorney, Agent, or Firm — Alleman Hall McCoy Russell & Tuttle LLP

(57) ABSTRACT

An electric vehicle comprises a first battery pack including a first battery which stores electric power for activating a wheel, and a vehicle body frame to which the first battery pack is mounted, wherein a suspending unit space in which a suspending unit which suspends and lifts up the first battery pack accommodated in a first battery accommodating space is placed is formed to be opened upward, above the first battery accommodating space, a lift-up space through which the first battery pack is movable upward, is formed, above the first battery accommodating space inside a vehicle body, and a carry-out space through which the first battery pack is movable to a space which is outside the vehicle body, is formed between an upper region of the lift-up space inside the vehicle body and the space which is outside the vehicle body.

3 Claims, 6 Drawing Sheets

(52) U.S. Cl.
CPC .......... *B60K 2001/0416* (2013.01); *B60K 2001/0422* (2013.01); *B60K 2001/0438* (2013.01); *B60K 2001/0466* (2013.01); *B60K 2015/0632* (2013.01); *B60K 2015/0638* (2013.01); *B60Y 2200/141* (2013.01); *Y02T 10/7005* (2013.01); *Y02T 10/7072* (2013.01); *Y02T 90/124* (2013.01); *Y02T 90/14* (2013.01)

(56) References Cited

U.S. PATENT DOCUMENTS

| | | | | |
|---|---|---|---|---|
| 3,687,484 | A * | 8/1972 | Cosby | B60K 1/04 280/755 |
| 4,273,500 | A * | 6/1981 | Yates | B66F 9/06 187/234 |
| 4,312,418 | A * | 1/1982 | Rittman | B60L 11/1877 180/69.21 |
| 2002/0134599 | A1* | 9/2002 | Magens | B60L 11/1822 180/68.5 |
| 2008/0179118 | A1* | 7/2008 | Herrmann | B60K 1/04 180/65.1 |
| 2009/0288898 | A1* | 11/2009 | Boegelein | B60L 11/1822 180/68.5 |
| 2011/0148088 | A1* | 6/2011 | Arnold | B60N 2/3013 280/807 |
| 2012/0217074 | A1* | 8/2012 | Rudinec | B60L 11/18 180/65.1 |

FOREIGN PATENT DOCUMENTS

| | | |
|---|---|---|
| JP | 2007284028 A | 11/2007 |
| JP | 2012051507 A | 3/2012 |

\* cited by examiner

ELECTRIC VEHICLE

TECHNICAL FIELD

The present invention relates to an electric vehicle comprising a battery pack including a battery for storing electric power for activating wheels, and a vehicle body frame to which the battery pack is mounted, and a method of carrying out the battery for the electric vehicle.

BACKGROUND ART

Patent Literature 1 discloses an exemplary conventional vehicle. This vehicle includes a frame. A seat is placed in a riding space above the frame, and an engine is placed below the seat.

CITATION LIST

Patent Literature

Patent Literature 1: Japanese Laid-Open Patent Application Publication No. 2007-284028

SUMMARY OF INVENTION

Technical Problem

However, in the vehicle disclosed in Patent Literature 1, in a case where the engine is replaced with a motor, it is necessary to provide a battery for supplying the electric power to the motor. In some cases, depending on a preservation state or the like, the battery may be significantly exhausted or deteriorated. Therefore, the battery is removed and remounted for the purpose of replacement or the like, after the vehicle is assembled. To increase the cruising distance of the vehicle, a battery with a high capacity and a large size is desirably used. However, it is difficult to increase the size of the battery to prevent interference between the battery and a vehicle body when the battery is removed and remounted.

The present invention has been made to solve the above described problem, and an object of the present invention is to provide an electric vehicle and a method of carrying out a battery for the electric vehicle, which can increase a battery pack in size while preventing interference between the battery pack and a vehicle body.

Solution to Problem

According to an aspect of the present invention, there is provided an electric vehicle comprising: a battery pack including a battery which stores electric power for activating a wheel; and a vehicle body frame to which the battery pack is mounted, wherein a suspending unit space in which a suspending unit which suspends and lifts up the battery pack accommodated in a battery accommodating space is placed is formed to be opened upward, above the battery accommodating space, wherein a lift-up space through which the battery pack accommodated in the battery accommodating space is movable upward is formed, above the battery accommodating space inside a vehicle body, and wherein a carry-out space through which the battery pack is movable to a space which is outside the vehicle body, is formed between an upper region of the lift-up space inside the vehicle body and the space which is outside the vehicle body.

In this configuration, in a case where the battery pack is carried out to the space which is outside the vehicle body, the suspending unit is moved down from above the vehicle body toward the battery pack, and connected to the battery pack. Then, the battery pack is suspended and lifted up by the suspending unit, and moved to the upper region of the lift-up space through the lift-up space. Then, the battery pack is supported by the suspending unit or another device and moved to the space which is outside the vehicle body, through the carry-out space. The battery pack is carried into the battery accommodating space in a procedure which is the reverse of the procedure for carrying out the battery pack from the battery accommodating space. This allows a large-sized battery pack to be removably mounted to the vehicle body without substantially disassembling the vehicle body, even when equipment other than production equipment (facility) is used.

According to the present invention, there is provided a method of carrying out a battery for an electric vehicle, in which a battery pack including the battery which stores electric power for activating a wheel is carried out to a space which is outside a vehicle body, the method comprising the steps of: exposing the battery pack placed in a battery accommodating space, when viewed from above; connecting to the battery pack a suspending unit which suspends and lifts up the battery pack; suspending and lifting up the battery pack, with the suspending unit such that the battery pack is moved away from the battery accommodating space; and moving the battery pack which is suspended and lifted up, in a direction which is perpendicular to a vertical direction, with the suspending unit or another device, and carrying out the battery pack to a space which is outside the vehicle body.

In this method, after the battery pack placed in the battery accommodating space is exposed when viewed from above, the battery pack is suspended and lifted up. Therefore, there is no interference between the battery pack and the vehicle body. In addition, since the battery pack which is suspended and lifted up is moved in the direction which is perpendicular to the vertical direction, and carried out to the space which is outside the vehicle body, the level at which the battery pack is suspended and lifted up can be lowered, and time required to carry out the battery pack can be reduced.

Advantageous Effects of Invention

In accordance with the present invention, with the above-described configuration, it is possible to provide an electric vehicle and a method of carrying out a battery for the electric vehicle, which can increase a battery pack in size, while preventing interference between the battery pack and a vehicle body.

DESCRIPTION OF EMBODIMENTS

Hereinafter, the embodiment of the present invention will be described with reference to the accompanying drawings. Hereinafter, the stated directions are referenced from the perspective of a driver riding in an electric vehicle of the present invention, and a rightward and leftward direction corresponds to a vehicle width direction.

Figure 1:
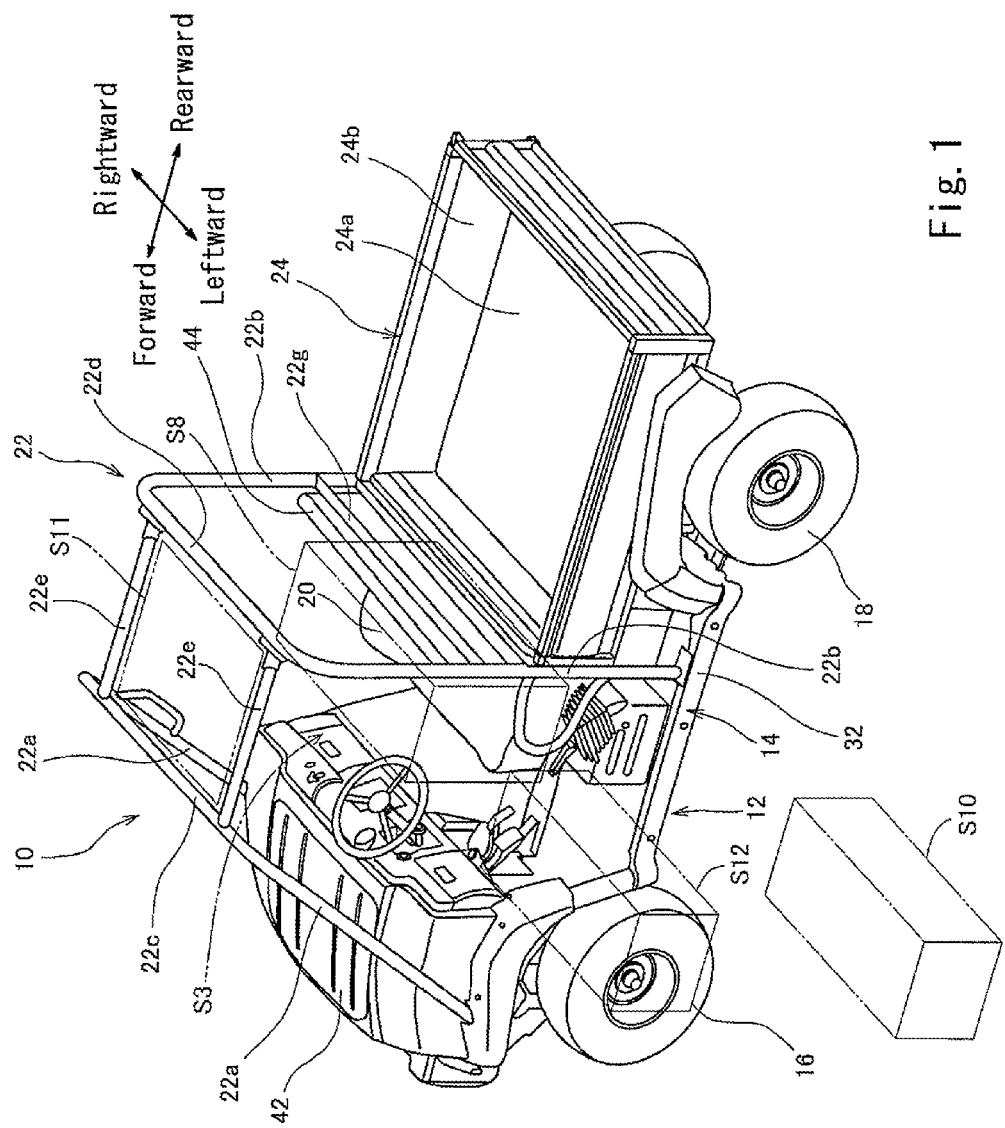
FIG. 1 is a perspective view showing the configuration of an electric vehicle according to an embodiment.
Figure 2:
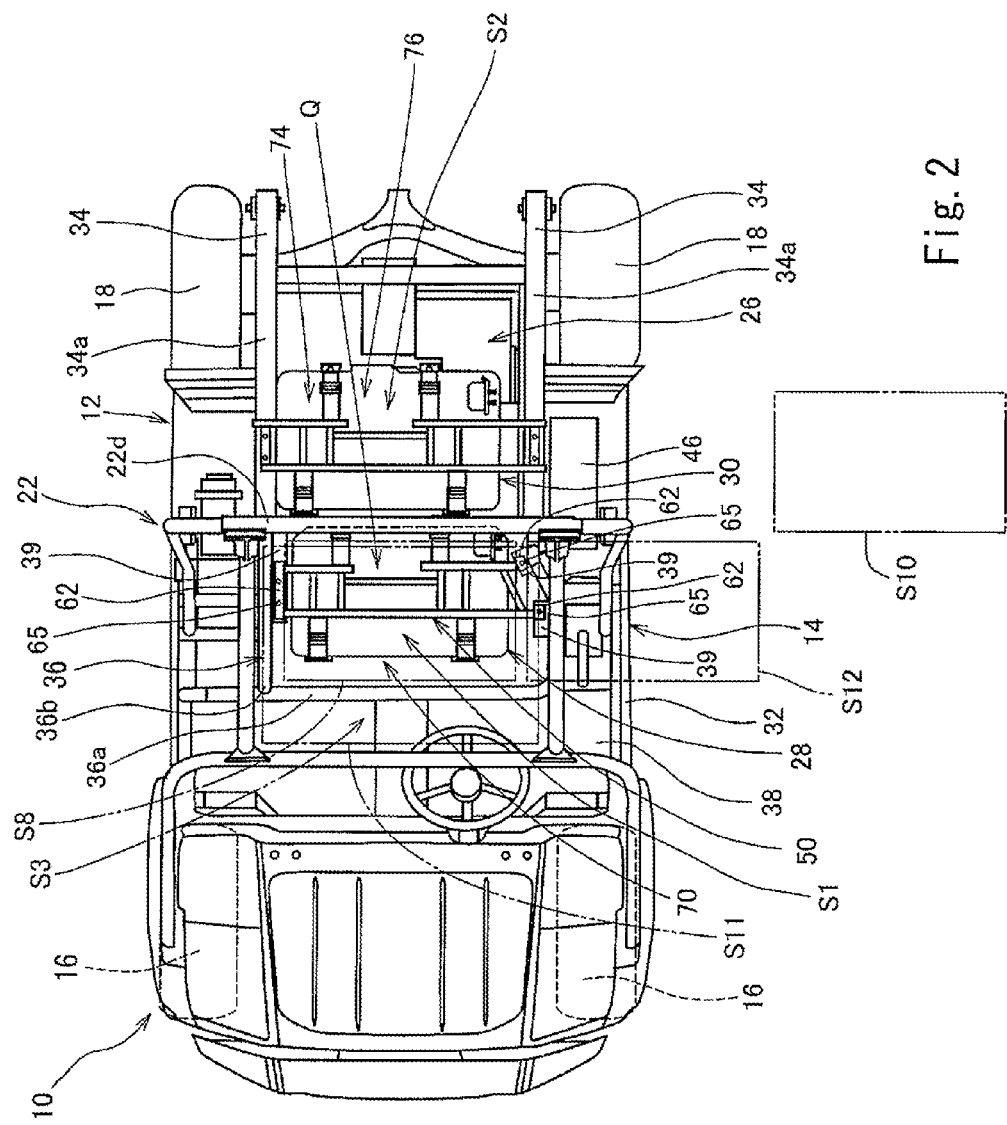
FIG. 2 is a plan view showing the configuration of the electric vehicle according to the embodiment.

FIG. 1 is a perspective view showing the configuration of an electric vehicle 10 according to an embodiment. FIG. 2 is a plan view showing the configuration of the electric vehicle 10. FIG. 2 shows a state in which a seat 20 and a cargo bed 24 are detached. The electric vehicle 10 of the present embodiment does not include an internal combustion engine, and is configured to generate a rotational driving power with electric power for activating wheels which is stored in batteries 28, 30, to activate (rotate) wheels 16, 18. The electric vehicle 10 is a multi-purpose vehicle which can be used for various purposes, such as a golf cart or an agricultural truck. This electric vehicle 10 is sometimes called a utility vehicle.

As shown in FIG. 1, the electric vehicle 10 includes a vehicle body frame 14 which is a base of a vehicle body 12, the pair of right and left front wheels 16 suspended from the front portion of the vehicle body frame 14, the pair of right and left rear wheels 18 suspended from the rear portion of the vehicle body frame 14, the seat 20, a cabin frame 22, and the cargo bed 24. As shown in FIG. 2, the electric vehicle 10 includes a motor unit 26 for activating the rear wheels 18, a first battery pack 70, and a second battery pack 76. The first battery pack 70 includes a first battery 28 for storing electric power for activating the wheels. The second battery pack 76 includes a second battery 30 for storing electric power for activating the wheels.

As shown in FIG. 2, the vehicle body frame 14 includes a floor frame 32 provided to face a road surface or a ground surface, a pair of right and left rear side frames 34 provided at the rear side of the floor frame 32 such that the rear side frames 34 extend in a forward and rearward direction, and a seat frame 36 provided over the floor frame 32 and the rear side frames 34.

The floor frame 32 is constituted by square pipes or cylindrical pipes which are made of metal. A plate-shaped floor panel 38 is mounted to the floor frame 32. A space surrounded by the floor panel 38 and the seat 20 (FIG. 1) is a first battery accommodating space S1 in which the first battery pack 70 is accommodated. That is, in the present embodiment, the seat 20 (FIG. 1) is placed above the first battery accommodating space S1. The first battery pack 70 is fastened to the vehicle body 12 when the first battery pack 70 is placed in the first battery accommodating space S1. A plurality of connectors are connected to the first battery 28 of the first battery pack 70. This allows the electric power to be supplied from the first battery 28 to electric loads (electric components and the like).

The rear side frames 34 are constituted by square pipes made of metal. Cargo bed receiver sections 34a which receive the cargo bed 24 (FIG. 1) are provided on the upper portions of the rear side frames 34, respectively. A battery loading section (not shown) which is the constituent member of the vehicle body frame 14 is provided in the front portion of a region which is located between the right and left rear side frames 34, when viewed from above. The second battery pack 76 is mounted in the battery loading section.

The space in which the second battery pack 76 is placed is a second battery accommodating space S2. The second battery pack 76 is fastened to the vehicle body 12 when the second battery pack 76 is placed in the second battery accommodating space S2. A plurality of connectors are connected to the second battery 30 of the second battery pack 76. This allows the electric power to be supplied from the second battery 30 to electric loads (electric components and the like).

The seat frame 36 includes a cross pipe member 36a supporting the front portion of the seat 20 (FIG. 1), and a pair of right and left longitudinal pipe members 36b supporting the right and left side portions of the seat 20. The cross pipe member 36a and the longitudinal pipe members 36b are constituted by cylindrical pipes made of metal. The right and left longitudinal pipe members 36b are provided with brackets 39, respectively, used to mount the first battery pack 70.

Figure 6:
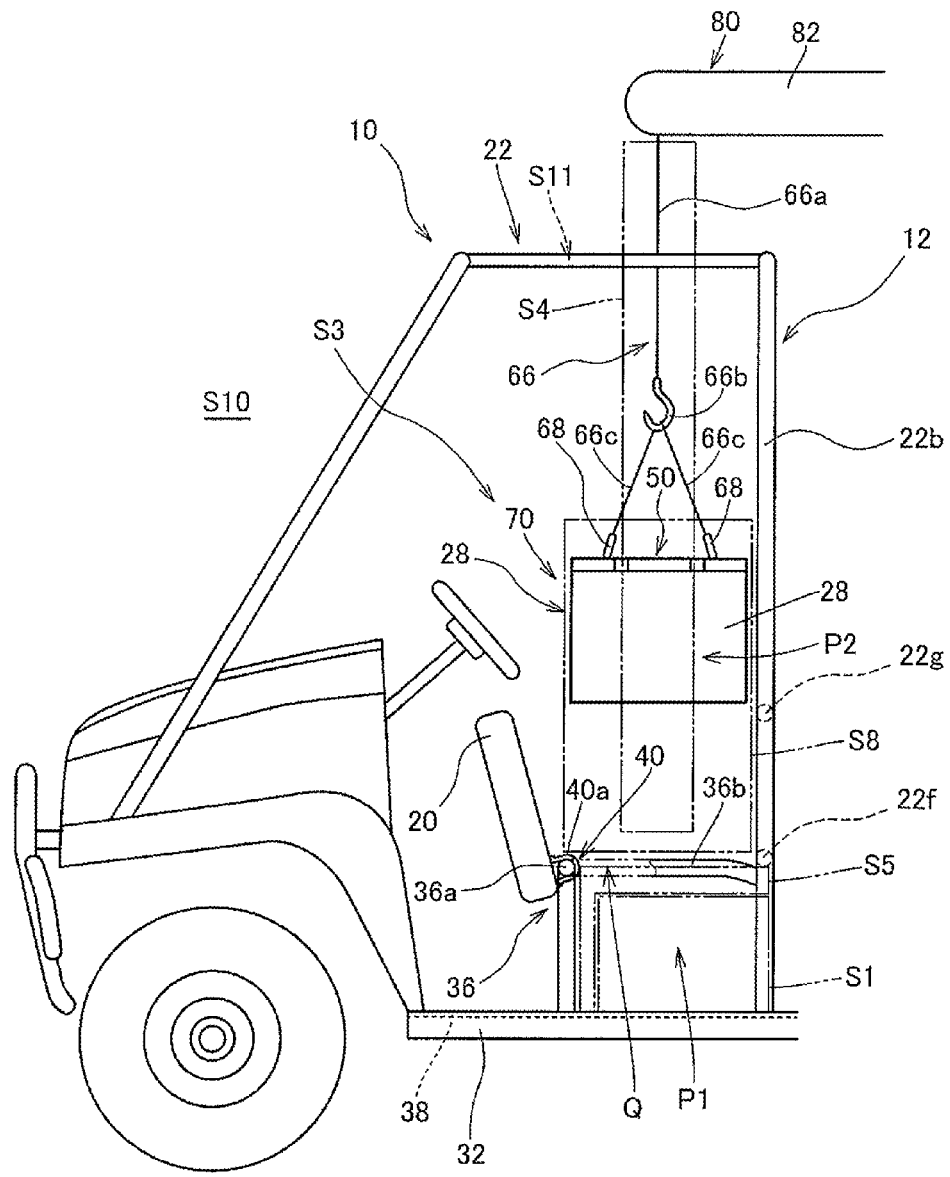
FIG. 6 is a left side view showing a space in which the first battery pack is movable.

As shown in FIG. 1, the seat 20 is a bench seat on which the driver and a passenger are seated, and extends in a rightward and leftward direction, at the center portion of the vehicle body frame 14, in the forward and rearward direction. As shown in FIG. 6, the front portion of the seat 20 is provided with a plurality of U-shaped engagement members 40 such that the engagement members 40 are spaced apart from each other in the rightward and leftward direction. A substantially-semi-cylindrical portion 40a of each of the engagement members 40 is rotatably engaged with the outer peripheral surface of the cross pipe member 36a.

Figure 3:
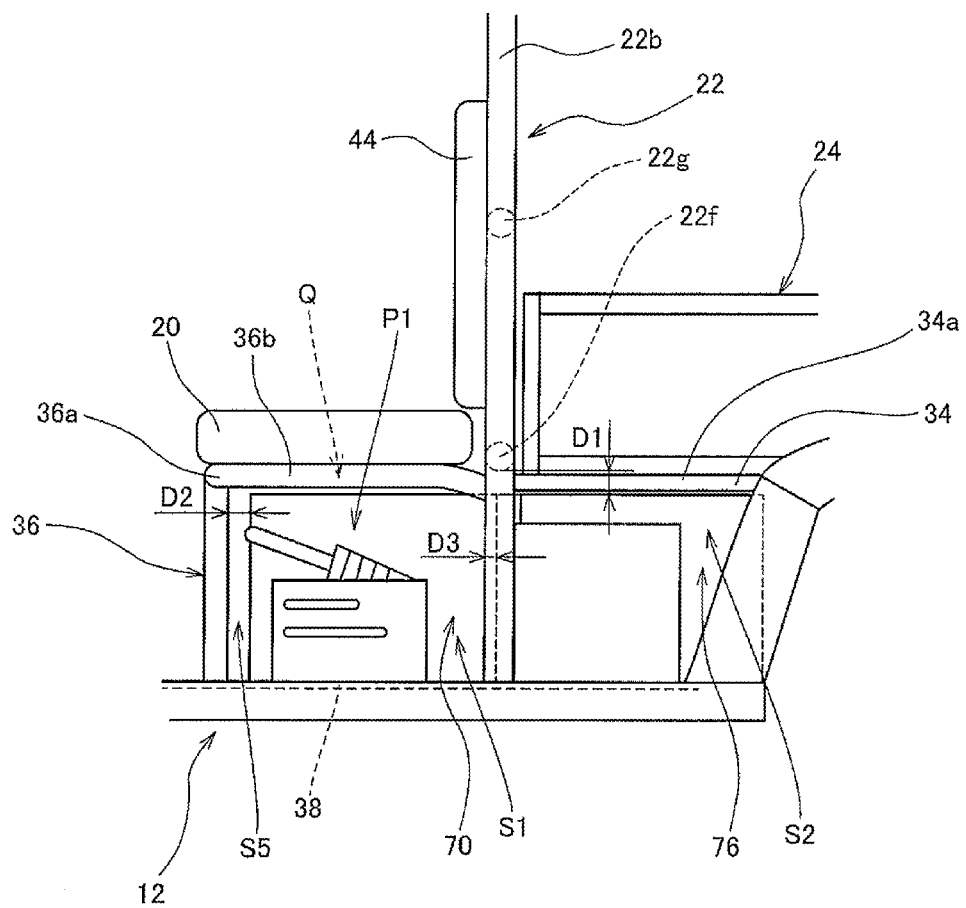
FIG. 3 is a left side view showing the layout of a first battery pack and a second battery pack.

As shown in FIG. 3, in a state in which the seat 20 is placed over the seat frame 36, the rear portion of the seat 20 is fastened to a first cross pipe member 22f of the cabin frame 22 by a lock mechanism (not shown). As shown in FIG. 6, when the lock mechanism (not shown) is unlocked, and the rear portion of the seat 20 is rotated upward about the front portion of the seat 20 provided with the engagement members 40, the seat 20 is retracted from a region (first suspending unit space S4 and second lift-up space S8) which is immediately above the first battery accommodating space S1, and thus the first battery accommodating space S1 is opened.

As shown in FIG. 1, the cabin frame 22 is constituted by metal cylindrical pipes such that a riding space S3 in which the seat 20 is placed is opened forward, rearward, leftward, rightward, and upward. The vehicle body 12 does not include a door which is opened or closed to allow the driver or the passenger to enter or exit the vehicle 10. The cabin frame 22 includes a pair of right and left front pillar pipe members 22a, a pair of right and left rear pillar pipe members 22b, a front cross pipe member 22c coupling the upper end portions of the front pillar pipe members 22a to each other, and a rear cross pipe member 22d coupling the upper end portions of the rear pillar pipe members 22b. In addition, the cabin frame 22 includes a pair of right and left longitudinal pipe members 22e coupling both end portions of the front cross pipe member 22c in the vehicle width direction to both end portions of the rear cross pipe member 22d in the vehicle width direction. The lower end portions of the front pillar pipe members 22a are connected to the side portions of a hood 42 or to the vehicle body frames 14 in locations which are near the side portions of the hood 42. The lower end portions of the rear pillar pipe members 22b are connected to the floor frame 32 in locations which are behind and below the seat 20. As shown in FIG. 1, an upper space S11 surrounded by the front cross pipe member 22c, the rear cross pipe member 22d, and the pair of right and left longitudinal pipe members 22e is in communication with the riding space S3 in a vertical direction FIG. 3 is a left side view showing the layout of the first battery pack 70 and the second battery pack 76. As shown in FIG. 3, the cabin frame 22 further includes a first cross pipe member 22f coupling the lower end portions of the rear pillar pipe members 22b to each other, and a second cross pipe member 22g coupling the vertical center portions of the rear pillar pipe members 22b. The first cross pipe member 22f serves to support the rear portion of the seat 20 via a support section (not shown).

The second cross pipe member 22g serves to support a backrest 44 used for supporting the driver's back and the passenger's back. The second cross pipe member 22g is placed above the first cross pipe member 22f. The backrest 44 is removably mounted to the second cross pipe member 22g. In the present embodiment, the rear pillar pipe members 22b are placed to extend in a direction perpendicular to the road surface or the ground surface. The rear cross pipe member 22d, the first cross pipe member 22f, and the second cross pipe member 22g overlap each other, when viewed from above. Each rear pillar pipe members 22b may be inclined such that its upper end portion is located forward or rearward relative to its lower end portion.

Figure 7:
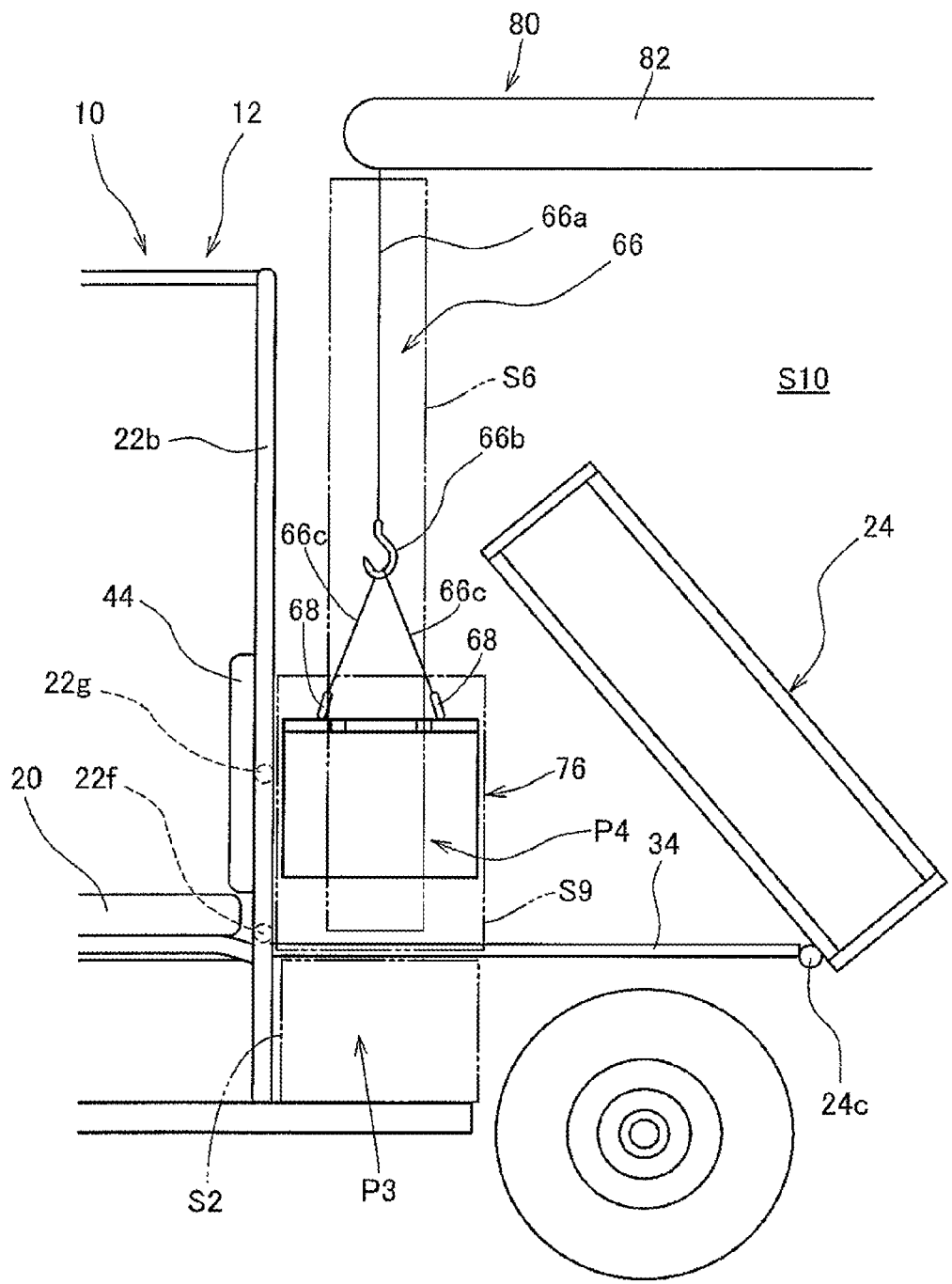
FIG. 7 is a left side view showing a space in which the second battery pack is movable.

As shown in FIG. 1, the cargo bed 24 includes a bottom wall 24a of a rectangular shape when viewed from above, and side walls 24b protruding upward from the four sides of the bottom wall 24a, and is opened upward. As shown in FIG. 7, the cargo bed 24 includes a rotary shaft 24c provided at a rear end portion thereof. The cargo bed 24 can be tilted rearward by raising its front portion manually or automatically. As shown in FIG. 3, a space which is located below the cargo bed 24 placed on the cargo bed receiver sections 34a of the rear side frames 34 and between the right and left rear side frames 34 when viewed from above, is the second battery accommodating space S2 for accommodating the second battery pack 6.

As shown in FIG. 2, the motor unit 26 is a driving power device which generates a driving power for activating the rear wheels 18 (rear wheels 18 and front wheels 16 during four-wheel drive). An inverter 46 for controlling the motor unit 26, a first battery 28 of the first battery pack 70 accommodated in the first battery accommodating space S1, and a second battery 30 of the second battery pack 76 accommodated in the second battery accommodating space S2 are connected to the motor unit 26 via electric wires (not shown).

Figure 4:
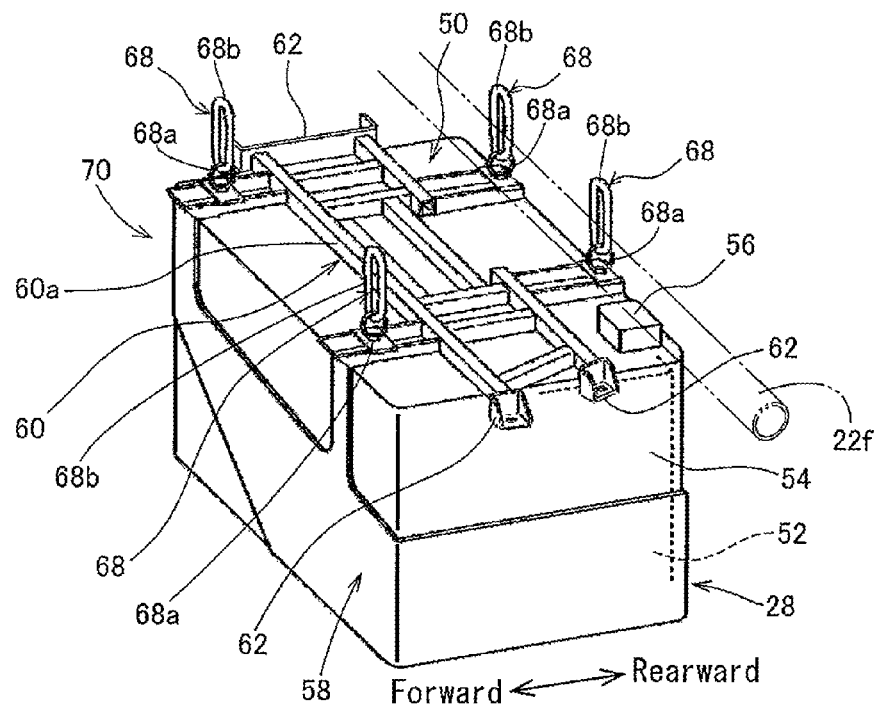
FIG. 4 is a perspective view showing the configuration of the first battery pack.

FIG. 4 is a perspective view showing the configuration of the first battery pack 70. As shown in FIG. 4, the first battery pack 70 includes the first battery 28, and a first battery support member 50 which is made of metal and serves to reinforce a battery container 54. The first battery 28 includes a plurality of battery bodies 52, and the battery container 54 which is made of an insulating resin and accommodates the plurality of battery bodies 52. The plurality of battery bodies 52 are connected in series to obtain a specified voltage. A charging port 56 is provided on the upper surface of the battery container 54 to connect an outside charging connector (not shown) to the battery container 54.

As shown in FIG. 4, the first battery support member 50 includes a support section 58 supporting the battery container 54 at least from below, and a frame member 60 placed on the upper surface of the battery container 54. The frame member 60 includes a plurality of square pipes 60a which are connected to each other. Fastening sections 62 are provided at the right and left end portions of the frame member 60 and fastened to the brackets 39 (FIG. 2), respectively. The support section 58 and the frame member 60 are connected to each other. The frame member 60 is provided with at least one (four in the present embodiment) mounting member 68 to which a suspending unit 66 (FIG. 6) is mounted. The mounting member 68 includes a first ring 68a and a second ring 68b connected to each other in a chain shape. The first ring 68a is coupled to the frame member 60. It is sufficient that the first battery pack 70 includes at least one battery body 52, and its specific design may be suitably changed.

Figure 5:
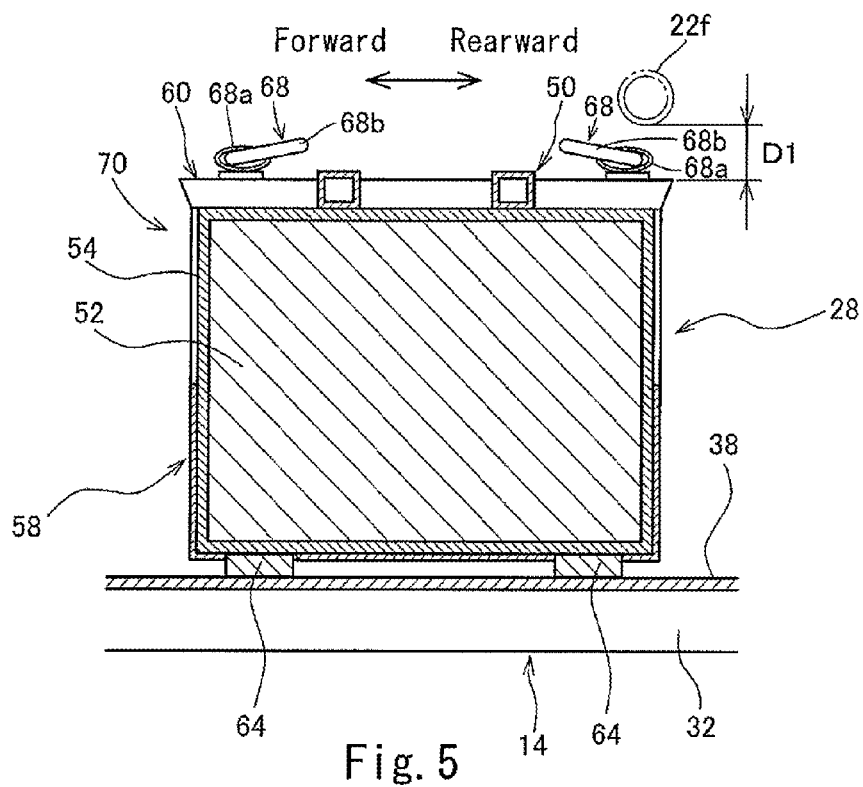
FIG. 5 is a cross-sectional view showing the mounting structure of the first battery pack.

FIG. 5 is a cross-sectional view showing the mounting structure of the first battery pack 70. As shown in FIG. 5, when each of the mounting members 68 is mounted to the frame member 60, the first ring 68a and the second ring 68b are placed substantially horizontally. Therefore, the mounting members 68 do not contact the first cross pipe member 22f placed above the first battery pack 70 to be spaced apart a predetermined dimension (first dimension D1) from the rear portion of the first battery pack 70. As shown in FIG. 6, when the first battery pack 70 is suspended by using the suspending unit 66, second wires 66c of the suspending unit 66 which are connected to the mounting members 68, respectively, are inclined with respect to the vertical direction, and thereby the mounting members 68 are inclined with respect to the vertical direction. At this time, the mounting members 68 provided at the rear portion of the first battery pack 70 are inclined forward in a state in which the mounting members 68 do not contact the first cross pipe member 22f. In this configuration, even though the rear portion of the first battery pack 70 is placed immediately below the first cross pipe member 22f, the first battery pack 70 can be lifted up from the floor panel 38, without moving the first battery pack 70 forward.

As shown in FIG. 5, buffering members 64 which are made of an elastic material such as rubber are provided on the lower surface of the battery container 54 (or support section 58). As shown in FIG. 2, when the fastening sections 62 are fastened to the brackets 39 by using fastening members 65 such as bolts, respectively, the buffering members 64 are compressed between the lower surface of the battery container 54 (or support section 58) and the upper surface of the floor panel 38, as shown in FIG. 5.

As shown in FIG. 2, the first battery pack 70 accommodated in the first battery accommodating space S1 has a shape in which the length in the rightward and leftward direction is much larger than the length in the forward and rearward direction. The rear cross pipe member 22d (FIG. 1), the first cross pipe member 22f (FIG. 3), and the second cross pipe member 22g (FIG. 3), which are the constituent members of the vehicle body 12, extend in a direction (rightward and leftward direction) which is perpendicular to the vertical direction and in which the first battery pack 70 extends.

FIG. 6 is a left side view showing a space in which the first battery pack 70 is movable. In the electric vehicle 10 of the present embodiment, the first battery pack 70 accommodated in the first battery accommodating space S1 is carried out to an outside space (space which is outside the vehicle body) S10 by using a suspending device 80. The suspending device 80 includes the suspending unit 66, a support member 82 supporting the suspending unit 66, and a lifting section (not shown). The suspending unit 66 includes a first wire 66a, a hook 66b attached to the lower end portion of the first wire 66a, and the second wires 66c which are connected to the mounting members 68 of the first battery pack 70 and hooked on the hook 66b. The lifting section (not shown) reels (rewinds) or unreels the first wire 66a to allow the hook 66b to move in the vertical direction. The support member 82 horizontally shifts the position at which the first wire 66a is suspended so that the first wire 66a and the hook 66b are moved horizontally.

The electric vehicle 10 of the present embodiment, of FIG. 6, is configured to carry out the first battery pack 70 accommodated in the first battery accommodating space S1 to the outside space S10 by using the suspending device 80.

Specifically, as shown in FIG. 1, the upper space S11 communicates with the riding space S3 in the vertical direction to allow the suspending unit 66 of FIG. 6 to be introduced into the riding space S3. As shown in FIG. 6, a part of the upper space S11 and a part of the riding space S3 are a first suspending unit space S4 in which the suspending unit 66 is placed. During normal driving, the seat 20 is placed between the riding space S3 and the first battery accommodating space S1, and the lower portion of the first suspending unit space S4 is closed by the seat 20. When the rear portion of the seat 20 is rotated upward about the front portion of the seat 20, the seat 20 is retracted from the first suspending unit space S4.

As shown in FIG. 3, the first cross pipe member 22f of the cabin frame 22 which is likely to become an obstacle to the operation for carrying out the first battery pack 70, is placed immediately above the first battery pack 70 accommodated in the first battery accommodating space S1 to be spaced apart a first dimension (distance) D1 from the rear portion of the first battery pack 70. The first dimension (distance) D1 is set so that the bottom portion of the first battery pack 70 does not interfere with the obstacle below the first battery pack 70, when the first battery pack 70 is moved forward in a state in which the first battery pack 70 is lifted up from the floor panel 38. For example, in a case where a nut (not shown) is placed in the floor panel 38 in a location which is forward relative to the first battery pack 70, the first dimension D1 is set larger than the height X1 of the nut (D1>X 1). In light of the changing magnitude X2 of the vertical dimension of the first battery pack 70 which is due to the fact that the first battery pack 70 is inclined, the first dimension D1 is preferably set to satisfy D1>X1+X2.

As shown in FIG. 3, the cross pipe member 36a of the seat frame 36 which is likely to become an obstacle to the operation for carrying out the first battery pack 70, is placed to be spaced apart a second dimension D2 in a forward direction from the front portion of the first battery pack 70. In the present embodiment, the first battery pack 70 and the first cross pipe member 22f overlap each other in the forward and rearward direction when viewed from above. When the dimension (overlap width) of a portion of the front end portion of the first cross pipe member 22f and a portion of the rear end portion of the first battery pack 70, which portions overlap each other in the forward and rearward direction, is expressed as a third dimension D3, the second dimension D2 is set larger than the third dimension D3 (D2>D3).

Since the dimensions D1 to D3 are set in the above described manner, a first lift-up space S5 is formed between the first battery pack 70 and the first cross pipe member 22f, and between the first battery pack 70 and the cross pipe member 36a so that the first battery pack 70 is movable upward and forward. Therefore, by moving the first battery pack 70 forward with the first battery pack 70 lifted up, the first battery pack 70 can be moved to a first lift-up position P1 which is immediately below a frame opening Q surrounded by the right and left longitudinal pipe members 36b, the cross pipe member 36a, and the first cross pipe member 22f.

As shown in FIG. 2, the distance in the rightward and leftward direction, between the pair of right and left longitudinal pipe members 36b of the seat frame 36, is set much longer than the length in the rightward and leftward direction, of the first battery pack 70 accommodated in the first battery accommodating space S1. As shown in FIG. 3, the distance in the forward and rearward direction, between the cross pipe member 36a of the seat frame 36 and the first cross pipe member 22f of the cabin frame 22, is set much longer than the length in the forward and rightward direction, of the first battery pack 70 accommodated in the first battery accommodating space S1. In this configuration, as shown in FIG. 6, the first battery pack 70 is movable from the first lift-up position P1 within the first battery accommodating space S1 to a second lift-up position P2 within the riding space S3 through the frame opening Q. In other words, above the first battery accommodating space S1, a second lift-up space S8 in which the first battery pack 70 placed in the first lift-up position P1 can be moved upward is formed to extend upward while avoiding interference with the constituent member of the vehicle body 12. During normal riding, the seat 20 is placed between the riding space S3 and the first battery accommodating space S1, and the lower portion of the second lift-up space S8 is closed by the seat 20. When the rear portion of the seat 20 is rotated upward about the front portion of the seat 20, the seat 20 is retracted from the second lift-up space S8.

As shown in FIG. 1, the cabin frame 22 is configured such that the riding space S3 in which the seat 20 is placed is opened forward, rearward, leftward, rightward, and upward. This allows the first battery pack 70 to be moved to the outside space S10 in any direction. In other words, between the upper region of the second lift-up space S8 inside the vehicle body 12 and the outside space S10, there is formed a carry-out space S12 through which the first battery pack 70 is movable to the outside space S10.

In the present embodiment, from the perspective of the first battery pack 70 located in the upper region of the second lift-up space S8, the opening of the cabin frame 22, at one side in the rightward and leftward direction, is set much larger in dimension than the cross-section of the first battery pack 70, which is perpendicular to the rightward and leftward direction. This opening constitutes a part of the carry-out space S12, in a location which is below the upper portion of the vehicle body 12. Therefore, the first battery pack 70 located in the upper region (second lift-up position P2) of the second lift-up space S8 can be moved from one side in the rightward and leftward direction, through the carry-out space S12, and thus carried out to the outside space S10.

As shown in FIG. 2, the second battery pack 76 includes a second battery 30 and a second battery support member 74. The configuration of the second battery 30 is substantially the same as that of the first battery 28. The configuration of the second battery support member 74 is substantially the same as that of the first battery support member 50.

FIG. 7 is a left side view showing a space in which the second battery pack 76 is movable. In the electric vehicle 10 of the present embodiment, the second battery pack 76 accommodated in the second battery accommodating space S2 is carried out to the outside space S10, by using the suspending device 80. As shown in FIG. 7, the electric vehicle 10 of the present embodiment is configured to carry out the second battery pack 76 accommodated in the second battery accommodating space S2, to the outside space S10, by using the suspending device 80.

As shown in FIG. 7, above the second battery accommodating space S2, a second suspending unit space S6 in which the suspending unit 66 for suspending and lifting up the second battery pack 76 is placed is provided such that the second suspending unit space S6 is opened upward. Above the second battery accommodating space S2, a third lift-up space S9 in which the second battery pack 76 accommodated in the second battery accommodating space S2 is movable upward is formed to extend upward while avoiding interference with the constituent member of the vehicle body 12. During normal driving, the second suspending unit space S6 and the third lift-up space S9 are closed by the cargo bed 24. Therefore, the cargo bed 24 is likely to become an obstacle to the operation for carrying out the second battery pack 76. When the cargo bed 24 is tilted rearward manually or automatically, the cargo bed 24 is retracted from the second suspending unit space S6 and the third lift-up space S9, and thereby the second battery accommodating space S2 is opened upward.

As shown in FIG. 7, in the state in which the cargo bed 24 is tilted rearward, the second suspending unit space S6 and the third lift-up space S9 are opened at both sides of the vehicle body 12 in the rightward and leftward direction. Therefore, the second battery pack 76 placed in the upper region of the third lift-up space S9 can be carried out from one side in the rightward and leftward direction, to the outside space S10. In other words, between the upper region of the third lift-up space S9 inside the vehicle body 12 and the outside space S10, there is provided a carry-out space (not shown) through which the second battery pack 76 is movable from one side in the rightward and leftward direction to the outside space S10.

Hereinafter, with reference to FIG. 6, a method of carrying out the first battery pack 70 accommodated in the first battery accommodating space S1, to the outside space S10 will be described. When the first battery pack 70 is carried out to the outside space S10, as shown in FIG. 6, initially, the rear portion of the seat 20 is rotated upward about the front portion of the seat 20. Thereby, the seat 20 is retracted from the first suspending unit space S4 and the second lift-up space S8, and the first battery accommodating space S1 is opened upward. In brief, the first battery pack 70 accommodated in the first battery accommodating space S1 is exposed, when viewed from above. In addition, the backrest 44 which is an obstacle is detached from the second cross pipe member 22g, and the fastening members 65 of FIG. 2 are removed. FIG. 6 shows a state in which the first battery pack 70 is positioned in the upper region of the second lift-up space S8.

The support member 82 of the suspending device 80 is placed above the vehicle body 12. The suspending unit 66 is moved down from the support member 82 toward the first battery pack 70 (FIG. 2) accommodated in the first battery accommodating space S1, and connected to the mounting members 68 of the first battery pack 70. Then, in the first lift-up space S5, the suspending unit 66 suspends the first battery pack 70, lifts up the first battery pack 70 and causes the first battery pack 70 to move forward to the first lift-up position P1 which is below the frame opening Q. In this way, the first battery pack 70 is positioned in the first lift-up position P1. Then, the suspending unit 66 lifts up the first battery pack 70 to a higher position to cause the first battery pack 70 to be away from the first battery accommodating space S1. Then, the first battery pack 70 is moved to the second lift-up position P2 above the frame opening Q through the second lift-up space S8.

When the first battery pack 70 positioned in the second lift-up position P2 is carried out to the outside space S10 through the carry-out space S12 (FIG. 1) provided at one side in the rightward and leftward direction, a loading unit (not shown) of a loading device, such as a fork lift, is moved from outside the cabin frame 22 through the carry-out space S12 (FIG. 1) to a location that is closer to the first battery pack 70 placed in the second lift-up position P2. The first battery pack 70 is supported on the loading unit from below, then the suspending unit 66 is removed from the mounting members 68 of the first battery pack 70, and then the loading unit (not shown) with the first battery pack 70 supported thereon is moved to the outside space S10 through the carry-out space S12 (not shown). The first battery pack 70 is carried into the first battery accommodating space S1 through a procedure which is the reverse of the procedure for carrying out the first battery pack 70 from the first battery accommodating space S1.

In a case where the first battery pack 70 is carried out to the outside space S10 from a direction that is perpendicular to the vertical direction by using the suspending unit 66, any of the right and left longitudinal pipe members 22e, the front cross pipe member 22c and the rear cross pipe member 22d of the cabin frame 22 is likely to become an obstacle to the movement of the suspending unit 66. To avoid this, at least one of the right and left longitudinal pipe members 22e, the front cross pipe member 22c, and the rear cross pipe member 22d is configured to be detachable, and is detached when the suspending unit 66 is moved. In other words, in this case, the first suspending unit space S4 is openable in a direction perpendicular to the vertical direction, from a region which is located immediately above the second lift-up space S8.

Hereinafter, with reference to FIG. 7, a method of carrying out the second battery pack 76 accommodated in the second battery accommodating space S2, to the outside space S10 will be described. When the second battery pack 76 is carried out to the outside space S10, initially, as shown in FIG. 7, the cargo bed 24 is tilted rearward manually or automatically, and retracted from the second suspending unit space S6 and the third lift-up space S9. The second battery accommodating space S2 is opened upward, and the second battery pack 76 placed in the second battery accommodating space S2 is exposed, when viewed from above. In addition, the suspending unit 66 is moved down from the support member 82 of the suspending device 80 toward the second battery pack 76 and connected to the mounting members 68 of the second battery pack 76. Then, the second battery pack 76 is suspended and lifted up by the suspending unit 66. Thereby, the second battery pack 76 positioned in the third lift-up position P3 is moved away from the second battery accommodating space S2, and moved to a fourth lift-up position P4 located in the upper region of the third lift-up space S9, through the third lift-up space S9. After that, the second battery pack 76 is supported by the suspending unit 66 or another device (e.g., fork lift). The second battery pack 76 is moved from one side in the rightward and leftward direction through the carry-out space (not shown), and thus carried out to the outside space S10. The second battery pack 76 is carried into the second battery accommodating space S2 through a procedure which is the reverse of the procedure for carrying out the second battery pack 76 from the second battery accommodating space S2. FIG. 7 shows a state in which the second battery pack 76 is positioned in the upper region of the third lift-up space S9.

In accordance with the present embodiment, with the above described configuration, the following advantages can be achieved. As shown in FIGS. 6 and 7, even in a case where equipment which is other than production equipment (facility) is used, the first battery pack 70 and the second battery pack 76 can be easily removably mounted to the vehicle body 12 without interference with the vehicle body 12. This can increase the first battery pack 70 and the second battery pack 76 in size. In addition, since the first battery pack 70 and the second battery pack 76 can be removably mounted to the vehicle body 12 without substantially disassembling the vehicle body 12, time taken to mount and remove the first battery pack 70 and the second battery pack 76 can be reduced.

The second lift-up space S8 of FIG. 6 and the third lift-up space S9 of FIG. 7 extend upward while avoiding interference with the constituent members of the vehicle body 12. This allows the first battery pack 70 and the second battery pack 76 to move upward without interference with the vehicle body 12. In addition, since the first cross pipe member 22f, which is the constituent member of the vehicle body 12, is placed above the first battery pack 70, the space which is located above the first battery pack 70 can be efficiently used.

The rear cross pipe member 22d (FIG. 1), the first cross pipe member 22f (FIG. 3), and the second cross pipe member 22g (FIG. 3) extend in the direction which is perpendicular to the vertical direction and in which the first battery pack 70 and the second battery pack 76 extend, the first battery pack 70 and the second battery pack 76 are less likely to interfere with the constituent member of the vehicle body 12.

When the first battery pack 70 which is suspended and lifted up by the suspending unit 66 of FIG. 6, is moved in the direction which is perpendicular to the vertical direction and carried out to the outside space S10, a vertical level at which the first battery pack 70 is suspended and lifted up can be made lower and time required to carry out the first battery pack 70 can be made shorter, than in a case where the first battery pack 70 is moved upward and carried out to the outside space S10. In this case, by opening the first suspending unit space S4 in the direction which is perpendicular to the vertical direction, from the region located immediately above the second lift-up space S8, the first battery pack 70 can be easily carried out by using the suspending unit 66.

As shown in FIG. 6, since the seat 20 is placed above the first battery accommodating space S1, the space formed above the first battery accommodating space S1 can be efficiently utilized. As shown in FIG. 7, since the cargo bed 24 is placed above the second battery accommodating space S2, the space formed above the second battery accommodating space S2 can be efficiently utilized.

As shown in FIG. 2, when the first battery pack 70 is accommodated into the first battery accommodating space S1 from above, the fastening sections 62 can be received in the brackets 39 at the same time. The bracket 39 and the fastening section 62 can be easily fastened to each other, by the fastening member 65. For example, in a case where the fastening member 65 is a bolt, the bracket 39 and the fastening section 62 can be easily fastened to each other, by inserting the bolt into a hole (not shown) provided in the fastening section 62 and a hole (not shown) provided in the bracket 39, from above. This allows the first battery pack 70 to be removably mounted to the vehicle body 12 easily and quickly, in the first battery accommodating space S1.

As shown in FIG. 5, since the buffering members 64 are compressed between the lower surface of the battery container 54 (or support section 58) and the upper surface of the floor panel 38, it becomes possible to prevent a situation in which the first battery pack 70 is unstably fastened to the floor panel 38.

As shown in FIG. 6, the first suspending unit space S4 is formed to allow the suspending unit 66 to be movable in the direction which is perpendicular to the vertical direction, specifically, forward, in a state in which the suspending unit 66 is connected to the first battery pack 70 located in the first battery accommodating space S1. Therefore, the first battery pack 70 can be moved in the direction (forward) which is perpendicular to the vertical direction, in the state in which the first battery pack 70 is lifted up by the suspending unit 66, and positioned in the first lift-up position P1. In addition, as shown in FIG. 7, the second suspending unit space S6 is formed to allow the suspending unit 66 to be movable in the direction which is perpendicular to the vertical direction, specifically, to the right or to the left, in a state in which the suspending unit 66 is connected to the second battery pack 76 located in the fourth lift-up position P4. Therefore, the second battery pack 76 can be moved in the direction (to the right or to the left) which is perpendicular to the vertical direction, in the state in which the second battery pack 76 is lifted up by the suspending unit 66, and carried out to the outside space S10. As should be understood from the above, since the suspending unit spaces S4, S6 are extended in the direction which is perpendicular to the vertical direction, as well as the vertical direction, the first battery pack 70 and the second battery pack 76 can be removably mounted in more flexible locations, and the operation for mounting and removing the first battery pack 70 and the second battery pack 76 can be easily carried out.

The first battery pack 70 of FIG. 3 may be placed so as not to overlap with the first cross pipe member 22f which is the constituent member of the vehicle body 12, when viewed from above. In this case, a part of the first lift-up space S5 through which the first battery pack 70 is movable forward can be omitted. The first battery pack 70 of FIG. 2 may be placed so as to overlap with the seat frame 36 which is the constituent member of the vehicle body 12, when viewed from above. In this case, a movement space through which the first battery pack 70 is moved to the first lift-up position P1 (FIG. 6) at which the first battery pack 70 does not overlap with the seat frame 36 is provided inside the vehicle body 12. Or, the second battery pack 76 of FIG. 2 may be placed so as to overlap with the constituent member of the vehicle body 12, when viewed from above. In this case, a movement space through which the second battery pack 76 is moved to the third lift-up position P3 (FIG. 7) at which the second battery pack 76 does not overlap with the constituent member of the vehicle body 12 is provided inside the vehicle body 12. Or, only one of the first battery pack 70 and the second battery pack 76 may be mounted to the vehicle body 12.

The first battery pack 70 of FIG. 6 may be carried out by using the suspending device 80, from the carry-out space (not shown) provided above the second lift-up position P2, to the outside space S10. In this case, the upper space S11 of FIG. 1 may be formed to be much larger in dimension than the cross-section of the first battery pack 70 in the direction which is perpendicular to the vertical direction, or the carry-out space (not shown) through which the first battery pack 70 is moved may be formed by removing one of the pipe members 22c, 22d, 22e.

The first battery pack 70 of FIG. 6 may be carried out to the outside space S10, by using the first suspending device 80 (FIG. 6) including the first wire 66a which is moved through the upper space S11, and a second suspending device (not shown) including a first wire which is moved through a space outside the upper space S11. In this case, the suspending unit 66 of the first suspending device 80 may be disconnected from the first battery pack 70, after the suspending unit of the second suspending device is connected to the first battery pack 70 located in the second lift-up position P2. The first battery pack 70 located in the second lift-up position P2 can be carried out to the outside space S10 by using the suspending unit having a configuration which is suitably selected, instead of the above described configuration.

The first battery accommodating space S1 may be opened upward, by a configuration which is other than the configuration of FIG. 6. For example, the first battery accommodating space S1 may be opened upward (exposed when viewed from above), by rotating upward the front portion of the seat 20 about the rear portion of the seat 20, or by removing the seat 20.

Although in the above described embodiment, the first cross pipe member 22f (FIG. 6) which is likely to become an obstacle (constituent member of the vehicle body 12) to the upward movement of the first battery pack 70, is placed above the rear portion of the first battery pack 70, such an obstacle may be placed above the front portion of the first battery pack 70, above the left side portion of the first battery pack 70, or above the right side portion of the first battery pack 70. In this case, the first lift-up space S5 may be formed to allow the first battery pack 70 to move while avoiding interference with the obstacle. Or, the obstacle may be detachable such that it does not interfere with the first battery pack 70.

The first cross pipe member 22f of FIG. 6 may be removably mounted to the vehicle body 12 by means of fastening members such as bolts. In his case, by removing the first cross pipe member 22f, the mounting members 68 are easily mounted to the frame member 60 (FIG. 4) of the first battery pack 70 accommodated in the first battery accommodating space S1, and the suspending unit 66 is easily mounted to the mounting members 68. In addition, since an obstacle to the movement of the upward movement of the first battery pack 70 does not exist, the first battery pack 70 can be easily suspended and lifted up.

The mounting members 68 of FIG. 5 may be placed forward relative to the front end of the first cross pipe member 22f. In this case, the mounting members 68 are easily mounted to the frame member 60 of the first battery pack 70, in the state in which the first cross pipe member 22f is mounted to the vehicle body 12. In addition, the suspending unit 66 (FIG. 6) is easily mounted to the mounting members 68. In this case, the first cross pipe member 22f is placed above the first battery pack 70 to be spaced apart with the first dimension (distance) D1, and therefore, the first battery pack 70 can be suspended and lifted up.

INDUSTRIAL APPLICABILITY

As described above, the electric vehicle of the present invention has an advantage that the battery can be increased in size while avoiding interference between the battery and the vehicle body, and is effectively widely applicable to a utility vehicle or the like which achieve the advantage.

REFERENCE CHARACTER LIST

S1 first battery accommodating space
S4 first suspending unit space
S8 second lift-up space
S10 outside space
10 electric vehicle
12 vehicle body
28 first battery
14 vehicle body frame
66 suspending unit

The invention claimed is:
1. An electric vehicle used for multi-purposes, comprising:
a battery pack including a battery which stores electric power for activating a wheel;
a vehicle body frame to which the battery pack is mounted;
a constituent member of a vehicle body which covers a battery accommodating space accommodating the battery pack from above or opens the battery accommodating space in an upward direction, in a state in which the constituent member of the vehicle body is coupled to the vehicle body frame and placed inward in a vehicle width direction relative to the vehicle body frame;
a front cross pipe member extending in a rightward and leftward direction, in front of the battery pack;
a rear cross pipe member extending in the rightward and leftward direction, at a location that is rearward relative to the front cross pipe member and above the battery pack;
a first dimension provided between the battery pack and the rear cross pipe member, at a location that is above the battery pack;
a second dimension provided between the battery pack and the front cross pipe member, at a location that is in front of the battery pack; and
a third dimension which is an overlap width of a portion of a front end portion of the rear cross pipe member and a portion of a rear end portion of the battery pack, the portions overlapping with each other in a forward and rearward direction,
wherein a suspending unit space in which a suspending unit which suspends and lifts up the battery pack accommodated in the battery accommodating space is placed is formed to be opened upward, above the battery accommodating space, inside the vehicle body,
wherein a lift-up space through which the battery pack accommodated in the battery accommodating space is movable upward is formed, above the battery accommodating space inside the vehicle body,
wherein a carry-out space through which the battery pack is movable to a space which is outside the vehicle body, is formed between an upper region of the lift-up space inside the vehicle body and the space which is outside the vehicle body,
wherein a mounting member to which the suspending unit is mounted is provided on an upper surface of the battery pack, and
wherein the first dimension is set to be larger than a height of the mounting member, and the second dimension is set to be larger than the third dimension.

2. An electric vehicle used for multi-purposes, comprising:
a battery pack including a battery which stores electric power for activating a wheel;
a vehicle body frame to which the battery pack is mounted;
a constituent member of a vehicle body which covers a battery accommodating space accommodating the battery pack from above or opens the battery accommodating space in an upward direction, in a state in which the constituent member of the vehicle body is coupled to the vehicle body frame and placed inward in a vehicle width direction relative to the vehicle body frame;
a seat placed above the battery accommodating space;
a front cross pipe member extending in a rightward and leftward direction, in front of the battery pack;
a rear cross pipe member extending in the rightward and leftward direction, at a location that is rearward relative to the front cross pipe member and above the battery pack; and
a pair of right and left longitudinal pipe members supporting right and left side portions of the seat,
wherein a suspending unit space in which a suspending unit which suspends and lifts up the battery pack accommodated in the battery accommodating space is placed is formed to be opened upward, above the battery accommodating space, inside the vehicle body,
wherein a lift-up space through which the battery pack accommodated in the battery accommodating space is movable upward is formed, above the battery accommodating space inside the vehicle body,
wherein a carry-out space through which the battery pack is movable to a space which is outside the vehicle body, is formed between an upper region of the lift-up space inside the vehicle body and the space which is outside the vehicle body,
wherein the seat is retractable from the suspending unit space and the lift-up space, and
wherein a distance in the rightward and leftward direction between the pair of right and left longitudinal pipe members is longer than a dimension of the battery pack in the rightward and leftward direction, and a distance between the front cross pipe member and the rear cross pipe member is longer than a dimension of the battery pack in a forward and rearward direction.

3. An electric vehicle used for multi-purposes, comprising:
a battery pack including a battery which stores electric power for activating a wheel;
a vehicle body frame to which the battery pack is mounted;
a constituent member of a vehicle body which covers a battery accommodating space accommodating the battery pack from above or opens the battery accommodating space in an upward direction, in a state in which the constituent member of the vehicle body is coupled to the vehicle body frame and placed inward in a vehicle width direction relative to the vehicle body frame;
an accommodating container having the battery accommodating space;
a floor panel on which the accommodating container is placed;
a buffering member placed between the accommodating container and the floor panel and made of an elastic material; and
a fastening member for fastening the accommodating container and the front panel to each other,
wherein a suspending unit space in which a suspending unit which suspends and lifts up the battery pack accommodated in the battery accommodating space is placed is formed to be opened upward, above the battery accommodating space, inside the vehicle body,
wherein a lift-up space through which the battery pack accommodated in the battery accommodating space is movable upward is formed, above the battery accommodating space inside the vehicle body,
wherein a carry-out space through which the battery pack is movable to a space which is outside the vehicle body, is formed between an upper region of the lift-up space inside the vehicle body and the space which is outside the vehicle body, and
wherein in a state in which the buffering member is compressed in a direction to reduce a spacing between the accommodating container and the floor panel, the accommodating container is fastened to the floor panel.

* * * * *